United States Patent [19]

Su

[11] 4,295,865
[45] Oct. 20, 1981

[54] METHOD FOR REMOVING DUST FROM FLUE GASES

[76] Inventor: Wen-Shen Su, 9, Lane 29, Chung-Hau Rd., Cheng Hua City, Taiwan

[21] Appl. No.: 78,303

[22] Filed: Sep. 24, 1979

[51] Int. Cl.³ .............................................. B01D 47/06
[52] U.S. Cl. ......................................... 55/84; 55/228; 55/435; 239/550; 261/66; 261/118; 261/159; 261/DIG. 9
[58] Field of Search ............. 261/118, 91, 66, DIG. 9, 261/158–161, 2–8; 55/84, 225, 228, 435, 344; 239/550; 210/163, 164, 534–536

[56] References Cited

U.S. PATENT DOCUMENTS

| | | | |
|---|---|---|---|
| 1,812,356 | 6/1931 | Mills | 261/91 |
| 3,233,882 | 2/1966 | Calaceto | 261/118 |
| 3,414,247 | 12/1968 | Sama | 261/118 |
| 3,494,099 | 2/1970 | Eng et al. | 261/118 X |
| 3,577,709 | 5/1971 | Hoad | 261/118 X |
| 3,703,194 | 11/1972 | Giordano | 210/163 X |
| 3,733,788 | 5/1973 | Crowley | 261/118 X |
| 3,791,633 | 2/1974 | Lowe | 261/118 X |
| 3,920,774 | 11/1975 | Reigel et al. | 261/118 X |

FOREIGN PATENT DOCUMENTS 463840 6/1975 U.S.S.R. ............................. 261/158

*Primary Examiner*—Richard L. Chiesa

[57] ABSTRACT

A method for removing dust and noxious materials from flue gases within a tall chimney through which the dust can be collected efficiently without increasing the operating cost of the boiler. A spraying device assembly is adapted to be mounted in a vertical portion of a chimney so as to save space.

7 Claims, 5 Drawing Figures

METHOD FOR REMOVING DUST FROM FLUE GASES

BACKGROUND OF THE INVENTION

1. Field of the Invention

This invention relates to a method for removing fly-ash and noxious materials from the flue gases within a tall chimney and an apparatus therefor, and more particularly, to a method through which mist layers containing partially saturated vapor are formed at a vertical portion of the tall chimney for enhancing contacting area of the rising waste gas so as to readily catch the fly-ash and soluble noxious materials contained in the flue gases and discharge the liquid sludge out of the chimney to a treating vessel without interferring combustion in the boiler and the normal ventilating condition of the chimney.

2. Description of the Prior Art

In a conventional steam power plant or a factory needing a large quantity of steam, boilers heated by coal or heavy oil are always a main equipment. Commercial methods of separating dust, noxious materials, etc. from the flue gases caused by the combustion of the fuels can be mainly divided into a mechanical type and an electrostatic type. Ordinarily, the former, by means of a multi-cyclone or wet scrubbers, utilizes a ventilator to discharge the combusted gas from the flue through a by-pass pipe to a cyclone by using a pump to spray water on it. This does not meet the economical requirements since a relative large quantity of water and electricity are consumed. The latter, by means of an electrostatic precipitator or a Cottrell electrical dust collector, positions at opposite inner sides of the flue and employs direct current at voltages ranging from 25,000 to 100,000 volts so as to charge and collect the fine particles simultaneously, the particles deposited on the charging plates are then scrubbed or rapped to a waste treating vessel. The conventional electrostatic precitators are capable of efficiencies of 90 to 95 percent, but their first cost and operating cost are higher than the mechanical type of separators.

There is a need, therefore, to find a method or apparatus through which the first cost and the operating cost could be significantly reduced.

SUMMARY OF THE PRESENT INVENTION

In accordance with this invention provides a method of collecting dust from flue gases within a tall chimney, and an apparatus therefor. In the present invention, there is provided at least a set of spraying apparatus mounting on the inner wall of the tall chimney in a position which is at a bent portion of the flue to connect with the chimney where a turbulent flow might take place, heated water is sprayed out of the apparatus to form mist layers with partially saturated vapor in it above the turbulent portion of the flue gases, such that the mist layers will contact the flue gases and catch the fine particles and soluble noxious gases such as sulfate dioxide in the flue gases to form a liquid sludge to be discharged out of the chimney under a normal ventilating condition and a reasonable temperature drop of the chimney. Layers of the mist can be increased so as to enhance the area contacting with the flue gases.

Accordingly, it is an important object of the present invention to provide an apparatus mounting on the inner wall of a chimney at a much lower initial cost than that of the conventional dust collectors.

It is another object of the present invention to provide a method through which pre-heated water is sprayed out of the apparatus under a pressure of about 0.5 Kg/cm$^2$ and the normal ventilating conditions of the chimney, so that it saves a considerable amount of electrical energy without increasing the operating cost of the boiler.

It is a still further object of the present invention to provide a method through which temperature of the chimney is reduced to a certain point without using more fuel for combustion.

Yet another object of the present invention is to provide a smaller apparatus mounting in the chimney so as to save the space.

Other advantages and novel features of the present invention will become more apparent from a detailed description of the invention when considered in conjunction with the accompanying drawings, wherein:

DETAILED DESCRIPTION OF THE PRESENT INVENTION

Figure 1:
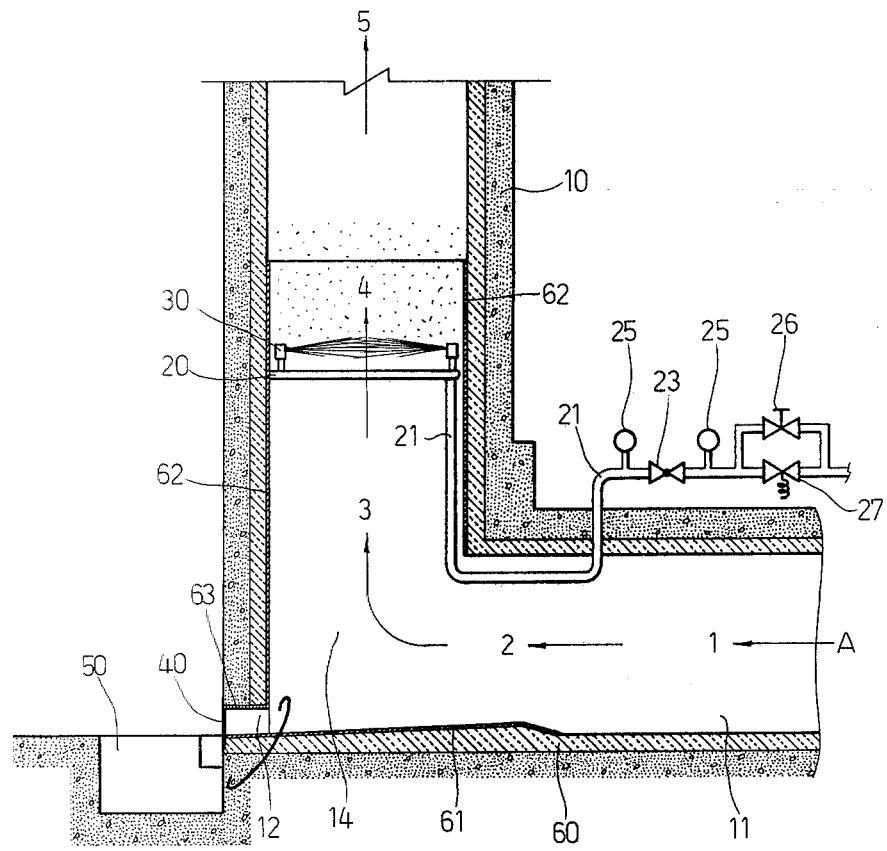
FIG. 1 is a longitudinal sectional view illustrating the mounting position of an apparatus in a chimney according to this invention.
Figure 2:
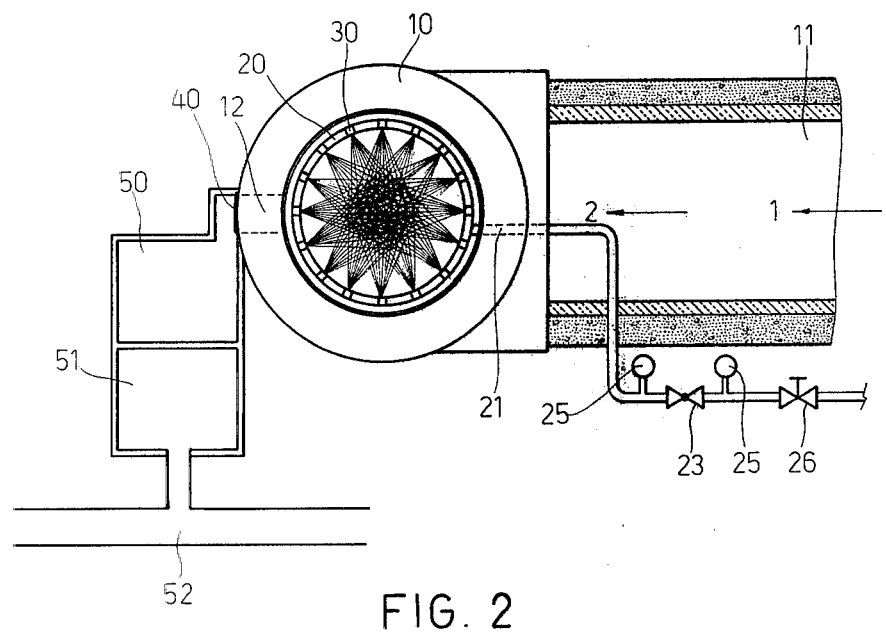
FIG. 2 is a top view of the chimney provided with the apparatus of the present invention illustrating the spraying of the apparatus and the position of a waste treating vessel.

Referring first to FIGS. 1 and 2, there is shown a spraying device assembly 20 according to the invention being provided around the inner wall of a chimney 10 and positioned above a position 3, which is the connecting portion of the vertical chimney 10 and a horizontal flue 11. Direction of arrow "A" resembles the flowing direction of the exhausted gases whose temperature is above 180° C. within the flue 11. The exhausted gases may form a turbulent flow at position 3 due to a sharp and sudden change of the flowing direction. Water, which is pre-heated to a certain temperature within a main water supplying pipe 21 by latent heat of the exhausted gases surrounded the outer surface of the main pipe 21, is being sprayed out of nozzles 30 of the spraying device assembly 20 to form mist layers 4. Part of the mist layers 4 formed by the sprayed water is pre-heated to form saturated vapor by latent heat of the exhausted gases so that the volume of the mist layers will expand at least 1500 times and accordingly save the water supply. The mist with partial saturated vapor layers 4 can positively catch the fine particles and react with the soluble noxious materials such as SO$_2$ entrained in the exhausted gases which pass through the mist layers to form liquid-sludge and then go down to an inclined bottom 60 of the chimney 10. Provided on the lower portion of the chimney 10 is an outlet 12 which is positioned at the lower end of the inclined bottom 60 so as to discharge the liquid-sludge deposited on the inclined bottom 60 to a precipitating vessel 50. After the fine particles of the liquid-sludge precipitate at the bottom of the vessel 50, the dirty liquid will flow into a polluted-water treating vessel 51 to be treated and, then, discharged into a drainage 52.

Figure 3:
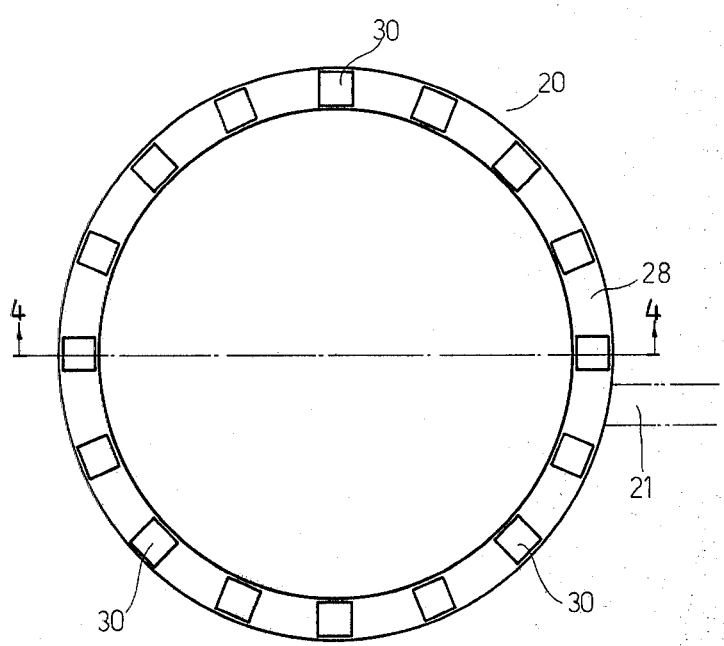
FIG. 3 is a top view of the spraying apparatus according to the present invention.
Figure 4:
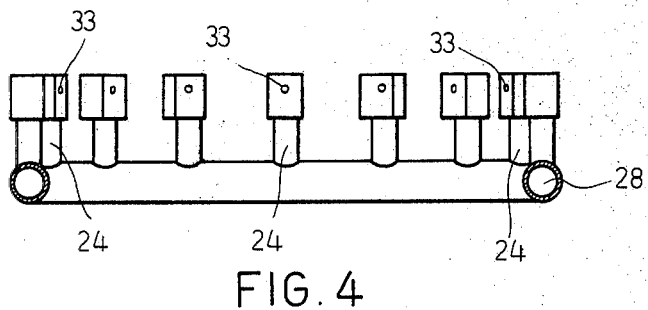
FIG. 4 is a sectional view alone the line 4—4 of FIG. 3.

FIGS. 3 and 4 show the construction of the spraying device assembly 20 in accordance with the invention.

Figure 5:
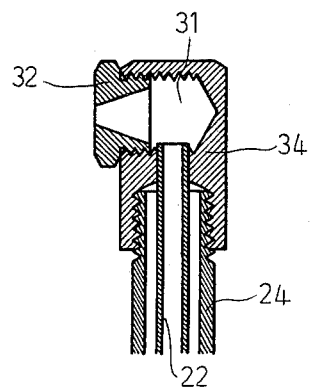
FIG. 5 is an enlarged sectional view of nozzles of the apparatus according to the present invention.

The spraying device assembly 20 consists of the main pipe 21, a circular pipe 28 communicating with one end of the main pipe 21, and a plurality of nozzles 30 mounting on the circular pipe 28. Orifices of the nozzles 30 are faced to the central point of the circular pipe 28 so as to enhance the spraying effect. As best shown in FIG. 5, the nozzle includes an outer supporting member 24 having external screw threads provided on the upper end thereof; a nozzle body 34 having a spraying chamber 31 therein and provided with female screw threads at the lower portion thereof so as to engage with the outer supporting member 24, the spraying chamber 31 is also provided with female screw threads therein; an atomizing nozzle 32 having external screw threads thereon for engaging with the front end of the spraying chamber 31. A branch pipe 22 is provided on the circular pipe 28 extending through the hollow outer supporting member 24 and terminating at the lower portion of the spraying chamber 31. In order to avoid the occurrence of any corrosion or wear and tear, all of the construction members of the spraying device assembly 20 in accordance with the invention are made of an anti-acid stainless steel except the nozzles 30 which are made of a kind of brass.

Provided at the outlet 12 is a checkered plate 40 for preventing an overabundance of cold air coming from the outlet 12 into the chimney 10 to reduce the temperature of the flue gases, so that the outlet 12 not only permits the liquid-sludge deposited on the inclined bottom 60 of the chimney 10 to be discharged, but also limits the quantity of cold air coming into the chimney 10.

On the lower portion of the inner wall of the chimney 10, the bottom 60 of the chimney and the inner wall of the outlet 12 are provided with stainless steel plates 62 so as to avoid the refractories which constitute the inner wall of the chimney being etched by the mist layers.

Since the mist layers sprayed out of the spraying device assembly 20 absorb the latent heat of the flue gases, temperature of the flue gases will be reduced to a certain degree that may result in a bad ventilating condition of the chimney 10 or an incomplete combustion. Therefore, according to this invention, a solenoid valve 27, a pressure regulating valve 23 and a by-pass valve 26 are provided on the main pipe 21 for controlling the water supply. At the upstream and downstream of the pressure regulating valve 23 are provided with a pressure gauge 25 for indicating the pressure in condition.

Before the boiler pressure reaches a certain value, for instance, 8 Kg/cm$^2$, or when the boiler is under a lower load of operation, the solenoid valve 27 will automatically close the main pipe 21 until the boiler pressure reaches a pre-determined value or operation of the boiler is in a normal condition. The electricity control falls in the scope of the known skills, it is, therefore, not described detailedly herein.

For a better understanding of the function of the present invention, a detailed testing data is given as follows:

Testing period: March 1976 to August 1979
Testing Place: Chung-Ho Textile Co. Wu-Tz Factory, Taichung, Taiwan, R.O.C.
Capacity of the boiler: 10 tons/hour
Type of the boiler: double drum water tube boiler
Fuel: slack coal
Calorific capacity of the fuel: 6428 Kcal/Kg.
Size of chain grate stoker: 5 m×2.6 m
Grate area: 13 m$^2$
Rate of combustion: 120 Kg/m$^2$hr.
Coal combusted per hour: 1560 Kg

| | | Analysis of Elements in the coal | | | | |
|---|---|---|---|---|---|---|
| C | H$_2$ | O$_2$ | N$_2$ | S | Water | Ash |
| 62% | 6.3% | 13% | 1.3% | 1.2% | 1.2% | 13% |

Height of the chimney: 45 m
Diameter of the chimney: 2 m
Spraying pressure of the nozzles: 0.25 Kg/m$^2$
Diameter of the Orifice: 4.7 mm
Number of the nozzles: 20 each
Jet velocity of the Nozzle: 2.26 m/sec.
Total quantity of the spraying water per minute: 46.6 Kg
Heat loss: 1210.21 Kcal/min.
Temperature drop: 32.41° C.
Temperature of the flue: 186° C.
Results of dust collection:
(A) Coal combusted per day: 25 tons
Spraying pressure: 0.15 Kg/cm$^2$
Spraying volume per day: 20.12 m$^3$
Recovered fine particles: 2.45 tons
Percentage of the recovered fine particles in total combusted coal: 9.8%
(B) Coal combusted per day: 37.5 tons
Spraying pressure: 0.25 Kg/cm$^2$
Spraying volume per day: 40 m$^3$
Recovered fine particles: 4.234 tons/day
Percentage of the recovered fine particles in total combusted coal: 11.28%

From various tests, it appears that spraying pressure of the nozzles is preferably 0.25 Kg/cm$^2$. It also appears that the recovered fine particles can release a considerable amount of heat of about 2,044 Kcal/Kg, so they may be mixed with the fuel and convoyed into the combustion chamber of the boiler.

It is obvious that many modifications and variations of the present invention are possible in the light of the above teachings.

What is claimed is:

1. A method for removing dust and noxious materials from flue gases within a tall chimney communicating with a flue, comprising the steps of:
forming mist layers above a location where said chimney communicates with said flue by spraying water with a spraying device assembly provided around the inner wall of said chimney;
heating a part of said mist layers to form saturated vapor layers by the latent heat of said flue gases;
catching fine particles and noxious materials entrained in said flue gases which pass through the mist layers;
permitting condensed droplets from said mist layers to flow down to an inclined surface located at the bottom of said chimney to form a liquid-sludge;
discharging said liquid-sludge along said inclined surface through an outlet positioned at the lower end of said inclined surface into a precipitating vessel; and
inhibiting cold air from entering the chimney through said outlet by disposing a checkered plate at an opening for said outlet in a wall of said chimney said method removing dust and noxious materials without appreciably affecting the normal ventilation of said chimney.

2. A method as claimed in claim 1, wherein the spraying pressure of said spraying device assembly is preferrably set at a range from 0.05 Kg/cm$^2$ to 0.50 Kg/cm$^2$.

3. A method as claimed in either one of the preceding claims, wherein the spraying pressure of said spraying device assembly is controlled by a solenoid valve which is interlocked with a boiler so as to adjust the temperature of said chimney depending on the combustion within said boiler.

4. A method as claimed in claim 1, wherein on the surface of the inner, lower wall of said chimney, inner wall of said outlet and said inclined bottom are provided with a stainless steel plate so as to prolong the life of said chimney.

5. A method as claimed in claim 1, wherein said spraying device assembly comprises a main pipe for supplying water, a circular pipe communicated with one end of said main pipe, and a plurality of nozzles mounting on and communicated with said circular pipe wherein orifice of each said nozzle faces the center point of said circular pipe so as to enhance the spraying effect.

6. A method as claimed in claim 5, wherein each said nozzle is surrounded by a hollow outer supporting member.

7. The method according to claim 1, further including the step of preheating the water supplied to said spraying device assembly in a pipe disposed in said chimney below said spraying device assembly.

* * * * *